United States Patent [19]

Faghri

[11] Patent Number: 5,297,619
[45] Date of Patent: Mar. 29, 1994

[54] CENTRIFUGAL HEAT PIPE VAPOR ABSORPTION HEAT PUMP

[75] Inventor: Amir Faghri, Dayton, Ohio

[73] Assignee: Wright State University, Dayton, Ohio

[21] Appl. No.: 933,775

[22] Filed: Aug. 24, 1992

Related U.S. Application Data

[63] Continuation-in-part of Ser. No. 710,085, Jun. 4, 1991, Pat. No. 5,201,196.

[51] Int. Cl.$^5$ .............................................. F28D 15/02
[52] U.S. Cl. ................................. 165/86; 165/104.25
[58] Field of Search ............................. 165/86, 104.25

[56] References Cited

U.S. PATENT DOCUMENTS

| | | |
|---|---|---|
| 2,559,217 | 7/1951 | Kehoe . |
| 3,605,436 | 7/1971 | Gammill, Jr. .................. 62/476 |
| 3,740,966 | 6/1973 | Pravda .......................... 62/476 |
| 4,405,013 | 9/1983 | Okamoto . |
| 4,553,408 | 11/1985 | Cross et al. .................... 62/476 |
| 4,611,474 | 9/1986 | Musinski . |
| 4,664,177 | 5/1987 | Edelstein . |
| 4,673,030 | 6/1987 | Basiulis . |
| 4,688,399 | 8/1987 | Reimann ......................... 62/513 |
| 4,699,206 | 10/1987 | Kirchmeier . |
| 4,706,739 | 11/1987 | Noren . |
| 4,714,108 | 12/1987 | Barry . |
| 4,755,350 | 7/1988 | Kennel . |
| 4,768,345 | 9/1988 | Kardas . |
| 4,770,232 | 9/1988 | Chubb . |
| 4,794,752 | 1/1989 | Redderson . |
| 4,805,419 | 2/1989 | Furukawa et al. . |
| 4,830,097 | 5/1989 | Tanzer . |
| 4,852,366 | 8/1989 | Harris . |
| 4,853,162 | 8/1989 | Liu . |
| 4,862,705 | 9/1989 | Nakamura et al. . |
| 4,869,075 | 9/1989 | Ikari et al. . |
| 4,869,313 | 9/1989 | Fredley . |
| 4,878,231 | 2/1990 | Miyouzaki . |
| 4,899,810 | 2/1990 | Fredley . |

FOREIGN PATENT DOCUMENTS

| | | | |
|---|---|---|---|
| 553438 | 5/1975 | U.S.S.R. ...................... | 165/86 |
| 794353 | 1/1981 | U.S.S.R. ...................... | 165/86 |
| 802773 | 2/1981 | U.S.S.R. ...................... | 165/86 |
| 1353978 | 11/1987 | U.S.S.R. ...................... | 165/86 |

OTHER PUBLICATIONS

Daniels, T. C. and Al-Jumaily, F. K., "Investigations of the Factors Affecting the Performance of Rotating Heat Pipe", Int. J. Heat Mass Transfer, vol. 18, pp. 961-973, 1975.

Holman, J. P., Thermodynamics, Third Edition, McGraw-Hill Book Co., pp. 599-602, 1980.

Herold, K. E. and Radermacher, R., "Absorption Heat Pumps", Mech. Engineering, pp. 68-73, Aug. 1989.

Faghri, A., "Performance Characteristics of a Concentric Annular Heat Pipe: Part II—Vapor Flow Analysis", J. of Heat Transfer, vol. III, pp. 851-857, Nov. 1989.

Thomas, S., Hankey, W. and Faghri, A., "One-Dimensional Analysis of the Hydrodynamic and Thermal Characteristics of Thin Film Flows Including the Hydraulic Jump and Rotation", J. of Heat Transfer, vol. 112, pp. 728-735, Aug. 1990.

Minning, C. P. and Basiulius, A., "Application of Osmotic Heat Pipes to Thermal-Electric Power Generation Systems", Source Unknown.

Primary Examiner—Albert W. Davis, Jr.
Attorney, Agent, or Firm—Killworth, Gottman, Hagan & Schaeff

[57] ABSTRACT

A heat pipe is disclosed for use in a vapor-absorption heat pump to provide high efficiency heat transfer between first and second fluids in contact with opposing first and second faces of the heat pipe. Although preferably disk-shaped and adapted for rotation for use in compact heat pumps, the heat pipe may be used in heat pump applications requiring other shapes, and may be either fixed or moving. In a further aspect of the invention, a vapor-absorption heat pump is provided incorporating at least one such heat pipe in at least one component thereof.

19 Claims, 5 Drawing Sheets

CENTRIFUGAL HEAT PIPE VAPOR ABSORPTION HEAT PUMP

This is a divisional of application Ser. No. 07/710,085 filed Jun. 4, 1991 now U.S. Pat. No. 5,201,196, granted Apr. 13, 1993.

BACKGROUND OF THE INVENTION

The present invention relates to heat pumps and heat transfer components therein, and in particular, to a plate incorporating a heat pipe across which high efficiency heat transfer may take place.

The need for energy conservation has been highlighted by concerns about the environment, leading to improvements in energy efficient heating and cooling systems. Increased attention has been directed to the development of efficient, cost-effective absorption heat pumps which use waste heat for heating and cooling and, thus, reduce energy consumption. The use of waste heat allows absorption heat pumps to deliver more energy to a heated space than they extract from an electric power grid or other high grade energy source. As a result, absorption heat pumps are gaining favor over the more conventional vapor compression heat pumps which are driven almost entirely by electric power.

Other environmental concerns favor the use of absorption heat pumps because they generate less noise and, more importantly, use fluids other than the chlorofluorocarbon refrigerants used in vapor compression heat pumps. Bans on chlorofluorocarbon refrigerants which cause injury to the earth's ozone layer have made absorption heat pumps increasingly more attractive.

Vapor-absorption heat pumps may operate in accordance with any of several vapor-absorption cycles known in the art, such as single or multi-stage cycles. As well, vapor-absorption heat pumps may operate at positive pressures or sub-atmospheric pressures, depending on the fluids used therein. Regardless, vapor-absorption heat pumps typically include an evaporator, an absorber, a vapor generator and a condenser and, preferably, additional heat exchangers. These heat pump components typically include heat transfer surfaces which may be fixed or moving. Fixed heat transfer surfaces are provided, for example, in that group of heat pumps generally referred to as falling film devices, which rely on gravity to distribute fluid across surfaces between which heat transfer takes place. More recent developments in the art have related to heat pumps having moving or rotating heat transfer surfaces.

In U.S. Pat. No. 4,553,408 (the '408 patent), Cross et al disclose a compact absorption heat pump in which at least one of the heat pump components comprises one or more rotatable plates across which heat transfer takes place. Such plates must be thin enough to permit high thermal flux from one face to another, but thick enough to provide necessary rigidity in operation. Thus, while they may be generally between 0.1 millimeters (mm) and 5 mm in thickness, they are typically between 0.25 mm and 1.25 mm thick to provide needed rigidity. Such plates are made of thermally conductive materials, typically mild steel, stainless steel, copper and aluminum.

Because of the significant role heat transfer surfaces play in heat pumps, such as the rotating plates in the compact, cost-effective absorption heat pump of the '408 patent, improvements in heat transfer efficiency across such plates are sought to provide further significant improvement in system performance and produce even greater energy savings.

SUMMARY OF THE INVENTION

The present invention satisfies that need by providing a plate comprising a heat pipe preferably disk-shaped., for high efficiency heat transfer between first and second faces of the plate. Heat pipes enjoy extremely high thermal conductivity, at least an order of magnitude higher than copper. Because of their substantially isothermal character, the temperature gradient between the first and second faces thereof is significantly reduced, and heat transfer between fluids in contact therewith is enhanced.

The heat pipe of the present invention includes opposing first and second walls which define a sealed, preferably disk-shaped, hollow body. The outer surfaces of these first and second walls serve as the first and second faces of the plate, respectively, while at least a portion of the opposing first and second inner surfaces of the first and second walls are used to vaporize and condense, respectively, a heat pipe working fluid.

In a first embodiment of the present invention, wick material is provided on at least a portion of the first and second inner surfaces in the heat pipe to provide a means for the heat pipe working fluid to move across the first and second inner surfaces by capillary action. At least one portion of wick material is further provided, extending between the first and second inner surfaces, to promote the return flow of the heat pipe working fluid by capillary action from the second, condensation surface to the first, evaporation surface. Such portion of wick material is preferably in the shape of a frustum, such as a conical frustum. The heat pipe may be further adapted for rotation, which also serves to spread the heat pipe working fluid across the first and second inner surfaces, and promotes return flow from the condensation to the evaporation surface along the portion of wick material extending therebetween.

It is preferred, in accordance with the first embodiment, that wick material substantially covers the first and second inner surfaces, and that the frustum of wick material is conical in shape. The frustum need not be continuous, but may be present in segments between the first and second inner surfaces. It is further preferred that the heat pipe be rotated, so that the presence of the frustum in the rotating heat pipe promotes return flow of heat pipe working fluid by both capillary action and by centrifugal force.

In a second embodiment of the present invention, no wick material is provided on or between the inner surfaces. The heat pipe is preferably adapted for rotation to spread the heat pipe working fluid by centrifugal force across the inner surfaces where it is alternately vaporized and condensed.

In an alternative configuration of the second embodiment, the inner region of the first face and the outer region of the second face are insulated to cause heating of the outer edge of the first face and the inner region of the second face. This alternative configuration is provided to permit evaporation of the heat pipe working fluid at the periphery of the first inner surface and condensation of heat pipe working fluid near the center portion of the second inner surface. The heat pipe working fluid may return to the periphery by centrifugal force, thus eliminating the need for an internal wick structure. As such, this alternative structure provides a manufacturing advantage, and may be more cost effective for some applications. The insulation used on the first and second faces may be a non-conductive paint or coating, such as teflon or ceramic, as are known in the art.

In a third embodiment, the heat pipe of the present invention does not include a wick on the first and second walls, but includes a frustum of wick material extending between at least portions of the inner surfaces of the first and second walls. The frustum, again, promotes the return flow of heat pipe working fluid by capillary action from the second inner surface to the first inner surface.

Further, in accordance with the first, second and third embodiments, it is preferred that the heat pipe include a taper between opposing first and second inner surfaces. While the centrifugal force of rotation tends to spread the heat pipe working fluid outward towards the periphery of the heat pipe, it has been found that tapering the distance between the opposing first and second inner surfaces from a maximum separation near the center to a minimum separation near the periphery, promotes inward, return flow of the heat pipe working fluid towards the central axis of the heat pipe.

In accordance with the first, second and third embodiments, the heat pipe of the present invention may be adapted for rotation upon a rotatable means for mounting the plate. Preferably the rotatable means for mounting is disposed generally along the central axis of the heat pipe and, by way of example, may comprise an axle adapted to be rotatably driven or a rotatable mount.

Inclusion of a taper and rotatable means for mounting are features which make the preferred embodiments of the present invention even more suitable for use as rotatable plates in vapor-absorption heat pumps, such as that of the '408 patent.

The heat pipe of the present invention is preferably used in compact vapor-absorption heat pumps such as shown by Cross et al in the '408 patent. To replace conventional rotatable disk-shaped plates as shown in the '408 patent, the heat pipe of the present invention is, preferably, disk-shaped and adapted for rotation. In forming a disk shape, the first and second walls may simply be joined to form a single edge at their peripheries or, as preferred, the heat pipe may include a peripheral end wall and resemble a short cylindrical segment.

The present invention may also be used in fixed plate heat pumps and made into other shapes for use in any application and any configuration where heat transfer occurs across opposite faces of a plate. Among applications of interest for vapor-absorption heat pumps are space-based applications. Vapor-absorption heat pumps having rotatable plates are particularly advantageous because, in the absence of gravity needed to operate certain fixed plate devices, rotation of the plates generates centrifugal force which spreads fluids across the opposing faces of the plate for heat transfer.

In a further aspect of the present invention, a vapor-absorption heat pump is provided in which at least one component thereof includes a plate comprising a heat pipe as disclosed herein. Vapor-absorption heat pumps typically are comprised of a set of operatively interconnected components including an evaporator, an absorber, a vapor generator and a condenser which operate in accordance with one of several possible cycles. Preferably, vapor-absorption heat pumps further comprise a heat exchanger to exchange heat between fluids going to and from the vapor generator. One or more components of vapor-absorption heat pumps may include a plate, either fixed or rotatably driven by a conventional drive means, across which heat transfer takes place. Thus, in accordance with this further aspect of the present invention, vapor-absorption heat pumps having one or more plates comprising a heat pipe as disclosed herein, enjoy improved thermal efficiency, and constitute a significant embodiment of the present invention.

The details of operation and construction of one vapor-absorption heat pump are described by Cross et al in the '408 patent which, as an exemplary case, is incorporated herein by reference. In general, however, in the '408 patent separate streams of fluids are delivered near the center of first and second faces of a rotating plate, and are spread across those faces to the periphery of the plate by centrifugal force due to rotation. In accordance with the present invention, that plate comprises a heat pipe as described herein, and the vapor-absorption heat pump so made in accordance with the present invention enjoys improved thermal efficiency. While the '408 patent describes the operation of the vapor-absorption heat pump in heating a medium to be heated, it will be understood by one skilled in the art that such vapor-absorption heat pumps may also be used to provide energy efficient cooling of a medium to be cooled.

Accordingly, it is an object of the present invention to provide a plate incorporating a heat pipe across which high efficiency heat transfer may take place. It is a further object of the present invention that such plate be used wherever heat transfer occurs across opposite faces of a plate, and a preferred application thereof is in vapor-absorption heat pumps. A still further object of the present invention is to provide a vapor-absorption heat pump wherein one or more of the components thereof include a plate incorporating a heat pipe to provide high efficiency heat transfer for heating or cooling. These and other objects of the invention will be apparent from the drawings, briefly described below, the detailed description which follows, and the appended claims.

DETAILED DESCRIPTION OF THE PREFERRED EMBODIMENT

Figure 2:
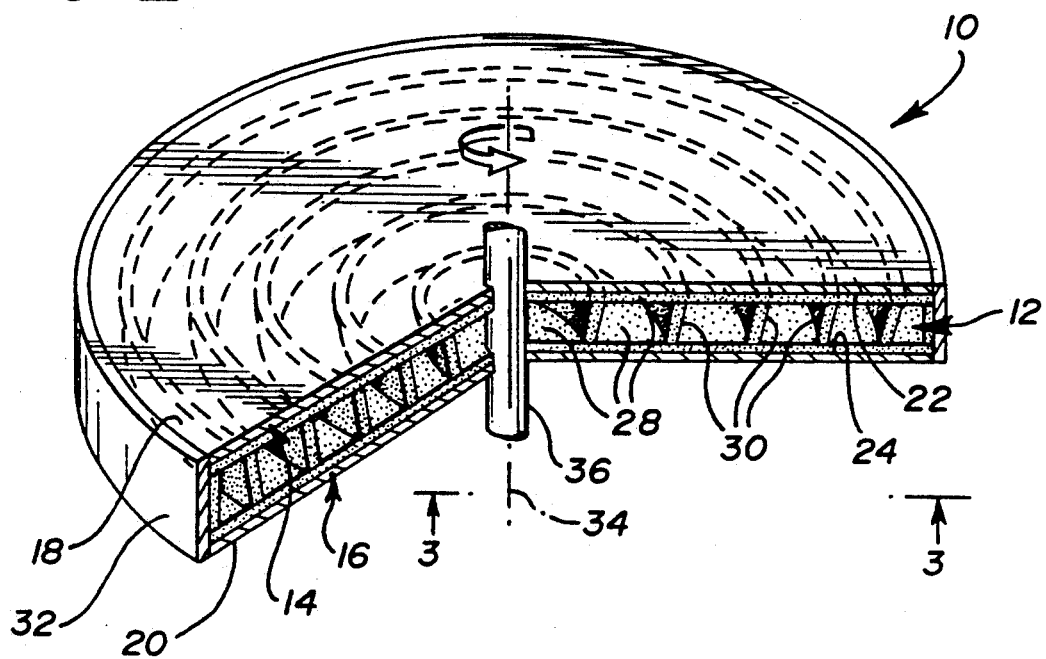
FIG. 2 is a schematic perspective view of a plate comprising a heat pipe in accordance with the present invention, partially cut away to show a cross-sectional view thereof.
Figure 3:
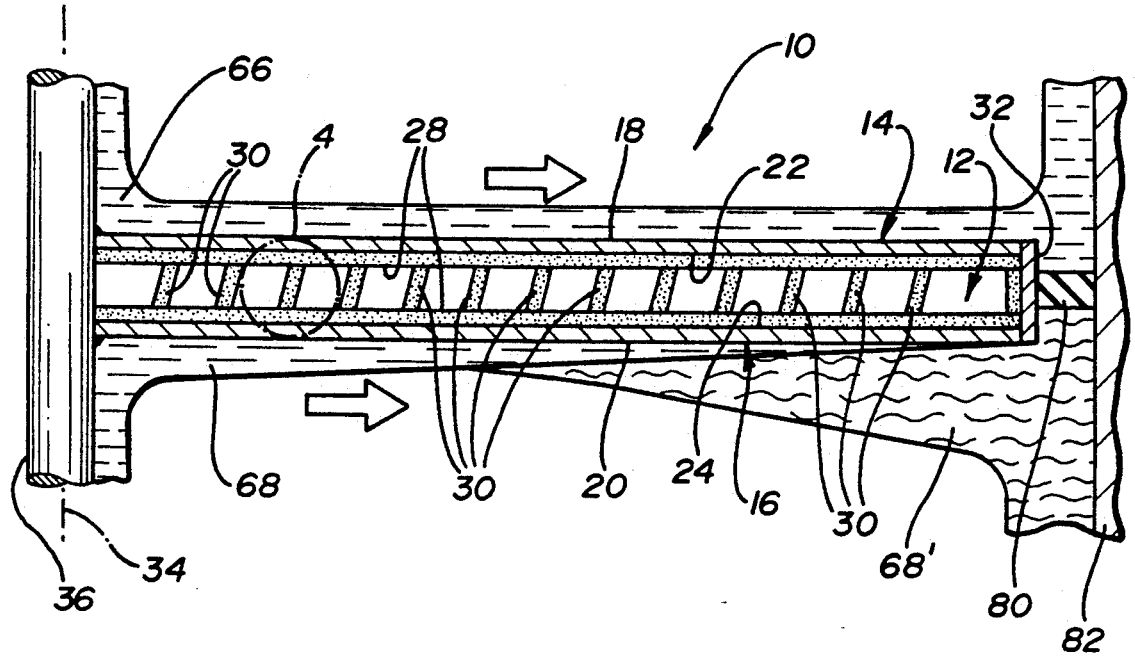
FIG. 3 is an enlarged schematic cross-sectional view of the plate of FIG. 2 taken along line 3—3.
Figure 4:
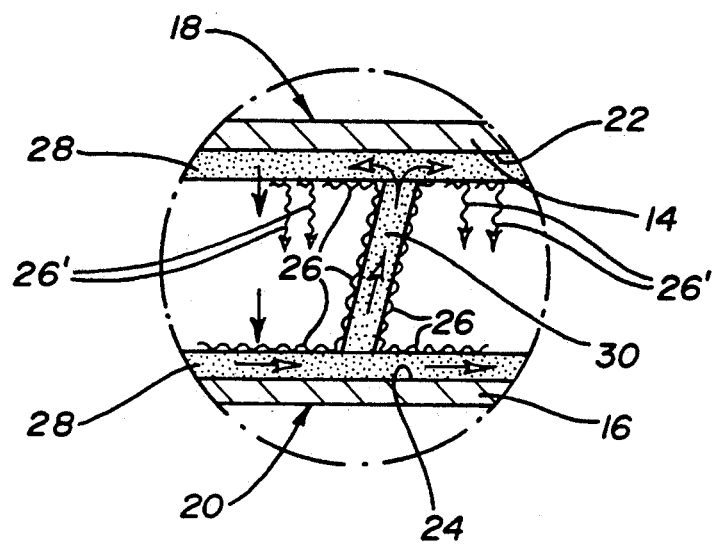
FIG. 4 is an enlarged detail of the heat pipe of FIG. 3 taken at detail area 4.

Referring to FIGS. 2–4, the heat pipe 10 of the present invention includes opposing first and second walls 14, 16 which define a sealed, preferably disk-shaped, hollow body 12. The outer surfaces of first and second walls 14, 16 serve as the first and second faces 18, 20 of the plate, respectively, while the opposing first and second inner surfaces 22, 24 of the first and second walls 14, 16 are used to vaporize and condense a heat pipe working fluid 26.

Generally, the operating temperatures of heat pipes are divided into cryogenic (below 122 degrees Kelvin (° K)), moderate (122° K to 628° K), and high (above 628° K) temperature ranges. The design operating temperature range determines the heat pipe working fluid 26 which will be used, and the material of first and second walls 14, 16 is determined both by the operating temperature range and compatibility with the working fluid 26. In cryogenic applications, heat pipe working fluid 26 may, for example, be nitrogen, oxygen or methane, as well as other known heat pipe working fluids 26. In moderate temperature applications, heat pipe working fluid 26 may be ammonia, Freon 21, or water, as well as other heat pipe working fluids 26 known in the art. In high temperature applications, heat pipe working fluid 26 may be a liquid metal, such as sodium, potassium and lithium, as well as other known heat pipe working fluids 26 for such applications.

Figure 5:
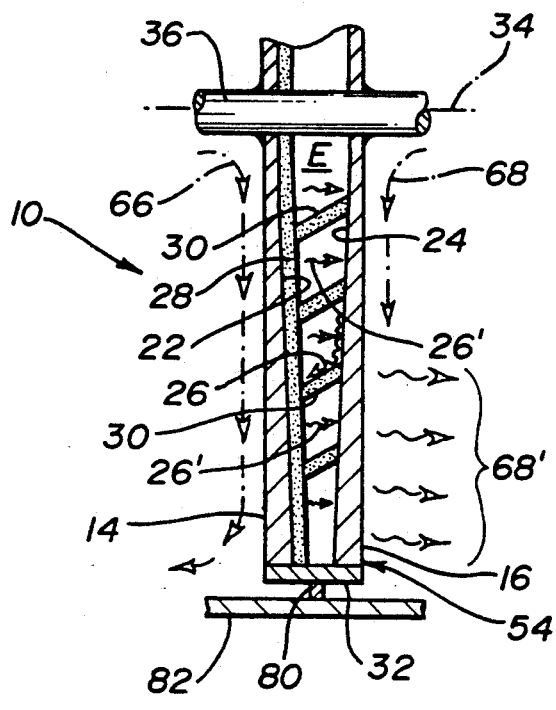
FIG. 5 is a schematic cross-sectional view of an evaporator of a vapor-compression heat pump including a plate incorporating a heat pipe in accordance with the present invention.

In a first embodiment, shown in FIGS. 2–4, a wick 28 of wick material is provided on at least a portion of the first and second inner surfaces 22, 24 in the heat pipe 10 to provide a means for the heat pipe working fluid 26 to move across the first and second inner surfaces 22, 24 by capillary action. Wick 28 is of wick material which is suitable for the temperature range and compatible with the working fluid 26 in an application, and may be screen mesh, fiberglass, sintered porous metal, and carbon fibers, as well as other wick materials known in the art. Alternately, wick 28 may be grooves in the first and second inner surfaces 22, 24. Preferably, the wick 28 entirely covers the first and second inner surfaces 22, 24. At least one piece or portion of wick material, such as a frustum-shaped wick 30, preferably a conical frustum, may also be provided between the first and second inner surfaces 22, 24 to promote the return flow of the heat pipe working fluid 26 by capillary action from the condensation surface to the evaporation surface. The frustum 30 may extend in a complete loop in the heat pipe 10 or be disposed therein in segments. Alternatively, as shown in FIG. 5, wick 28 may be on just one of the first and second inner surfaces 22, 24, for example, first inner surface 22.

Figure 8:
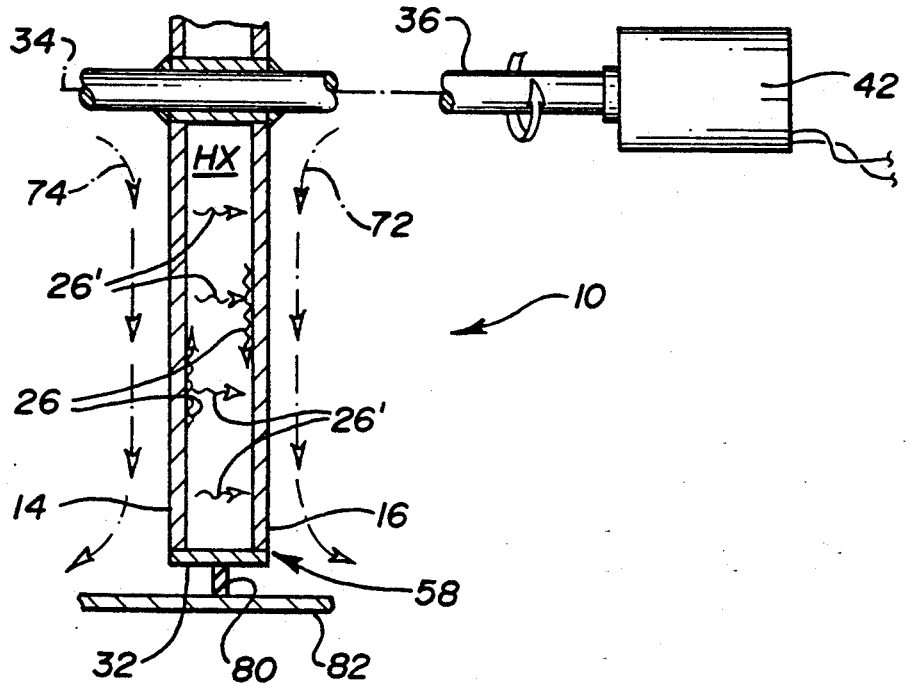
FIG. 8 is a schematic cross-sectional view of a heat exchanger including a plate incorporating a heat pipe in accordance with the present invention.

In a second embodiment, representatively shown in FIG. 8, the heat pipe 10 of the present invention does not include a wick 28 or frustum 30 on or between the first and second walls 14, 16. Rather, the heat pipe 10 is adapted for rotation and includes rotatable means for mounting such as axle 36. In the second embodiment, heat pipe working fluid 26 is spread across the inner surfaces 22, 24 for evaporation and condensation by centrifugal force imposed by rotation.

Figure 11:
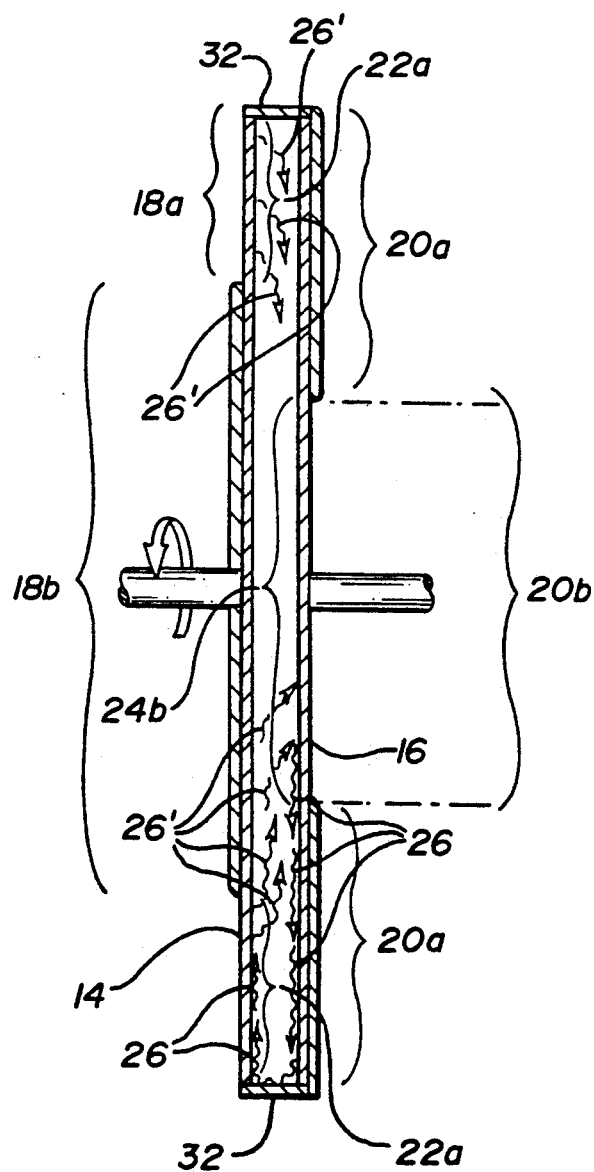
FIG. 11 is a schematic cross-sectional view of the second embodiment of the heat pipe of the present invention in an alternative configuration.

In an alternative configuration of the second embodiment, shown in FIG. 11, the inner region 18b of the first face 18 and the outer region 20a of the second face 20 are insulated to permit evaporation of the heat pipe working fluid 26 at the outer region 22a of the first inner surface 22 and condensation of the heat pipe working fluid 20b at the inner region 24b of the second inner surface 24. The heat pipe working fluid 26 may return from the inner region 24b of the second inner surface 24 to the outer region of the first inner surface 22a by centrifugal force, thus eliminating the need for a wick 28. As such, this alternative configuration provides a manufacturing advantage, and may be more cost effective for some applications. The insulation used on the first and second faces 18, 20 may be thermally non-conductive paints or coatings such as ceramic; or a fluorocarbon resin such as polytetrafluoroethylene (PFTE), fluorinated ethylene propylene (FEP), or perfluoroalkoxy (PFA), all of which are known as Teflon ®, available from DuPont de Nemours; or other thermally insulative materials as are known in the art.

Figure 12:
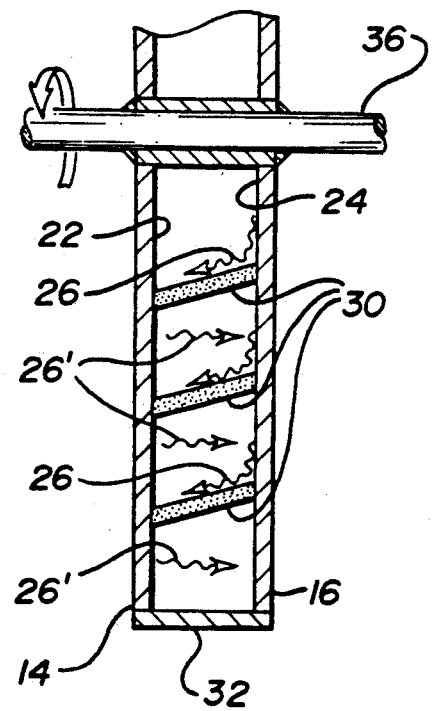
FIG. 12 is a schematic cross-sectional view of the third embodiment of the heat pipe of the present invention.

In a third embodiment, representatively shown in FIG. 12, the heat pipe 10 of the present invention does not include a wick 28 on the first and second walls 14, 16, but includes a frustum 30 of wick material extending between one or more portions of the first and second inner surfaces 22, 24 of walls 14, 16. Frustum 30 promotes the return flow of working fluid 26 by capillary action from the second inner surface 24 to the first inner surface 22.

The heat pipes 10 of the first, second and third embodiments may include additional structure which enhances thermal transfer of the heat pipe 10. For example, the heat pipe 10 may include fins (not shown) machined on the second inner surface 24 where condensation of the heat pipe working fluid 26 takes place, enhancing heat transfer.

Figure 10:
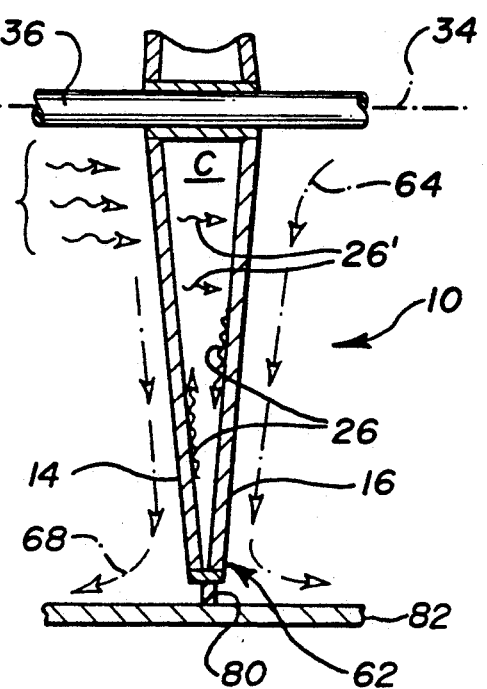
FIG. 10 is a schematic cross-sectional view of a compressor including a plate incorporating a heat pipe in accordance with the present invention.

The heat pipe 10 of the present invention is preferably used in compact vapor-absorption heat pumps having rotating plates, such as shown by Cross et al in the '408 patent, the disclosure of which is incorporated herein by reference. Thus, in accordance with the first and second embodiments of the present invention, the heat pipe 10 is preferably disk-shaped and adapted for rotation, to replace conventional rotatable disk-shaped plates. In particular, therefore, it is preferred that the disk-shaped heat pipe 10 of the present invention resemble a short cylindrical segment having first and second walls 14, 16 and peripheral end wall 32, as shown in FIGS. 2, 3, 6 and 8. However, other shapes are possible, such as shown in FIG. 10, as is the application of the heat pipe 10 in other vapor-absorption heat pump configurations where heat transfer occurs across opposite faces of a fixed or moving plate.

Where adapted for rotation, it is preferred that the heat pipe 10 include rotatable means for mounting, as shown by way of example in FIGS. 2, 3, 5, 6, and 8–10. For example, rotatable means for mounting may comprise attachment to a rotatably driven axle 36 disposed along central axis 34 through heat pipe 10, as shown in FIG. 8, or mounting upon a sleeve 38 including a bearing 40, as shown illustratively in FIG. 9. Drive means for rotating the rotatable means for mounting may comprise any conventional drive means, for example, electric motors 42, representatively shown in FIG. 8, attached to a source of electricity (not shown). Where the heat pipe 10 of the present invention is rotated in operation, fluids, whether liquid or vapor, are delivered near the center of the first and second faces 18, 20, and are urged or spread across faces 18, 20 towards the periphery of the plate by centrifugal force imposed by rotation.

Other details regarding the delivery, manifolding, and pumping of such fluids are illustrated, for example, in the '408 patent. Regardless of the precise means used, because heat pipe 10 provides for heat transfer between separate fluids on opposite first and second faces 18, 20, a seal 80 must be further provided around the periphery of the heat pipe to isolate the fluid streams present on the first and second faces 18, 20.

Figure 6:
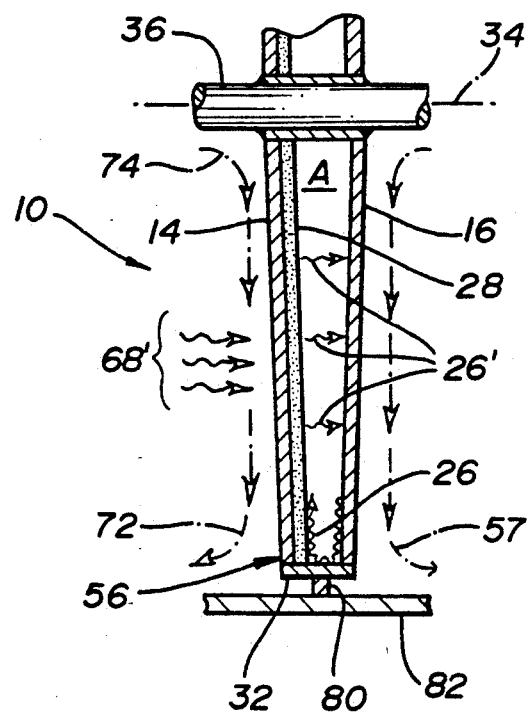
FIG. 6 is a schematic cross-sectional view of an absorber of a vapor-compression heat pump including a plate incorporating a heat pipe in accordance with the present invention.
Figure 9:
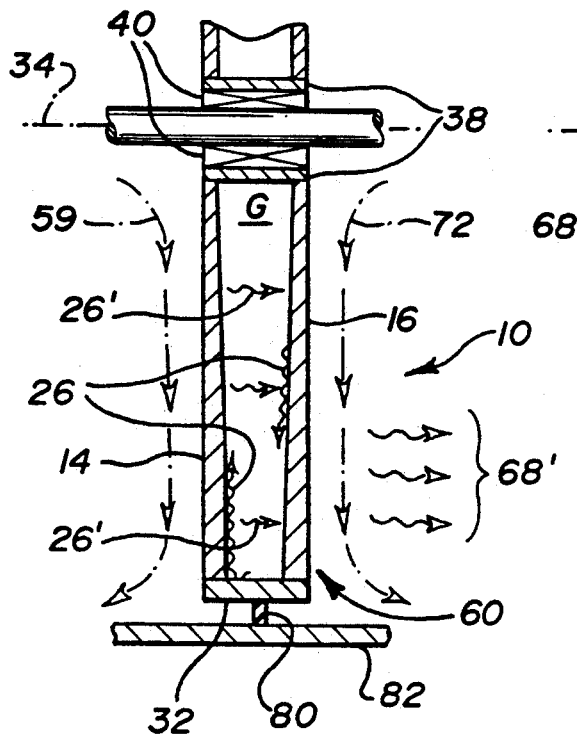
FIG. 9 is a schematic cross-sectional view of a generator including a plate incorporating a heat pipe in accordance with the present invention.

The centrifugal force of rotation also tends to spread the heat pipe working fluid 26 inside the heat pipe 10 outward towards its periphery. Thus, a taper is preferably provided between opposing first and second inner surfaces 22, 24 to promote the return flow of heat pipe working fluid 26 towards the center of heat pipe 10. As shown in FIGS. 6, 9 and 10, the distance between the opposing first and second inner surfaces 22, 24, tapers from a maximum separation near the center to a minimum separation near the circumferential periphery of the heat pipe 10. This taper may be provided in various ways. For example, the material of first and second walls 14, 16 may be thickened as it extends towards the periphery of the heat pipe 10, as in FIG. 9. Or, the thickness of the metal may be constant, while the first and second walls 14, 16 themselves are angled or bent to taper to a point or to peripheral end wall 32, as in FIGS. 6 and 10.

Because of the wide variety of sizes, vapor-absorption cycles, and heat pumps to which the heat pipe 10 of the present invention may be applied, the precise wick and wall materials, sizes, dimensions, thicknesses, recommended rotational speeds, taper and other details of construction will vary with the application. These design variables have a significant effect upon the heat transfer performance of the heat pipe 10 in a particular application, and may be developed for a particular application of the present invention by one skilled in the art. Further, details concerning the materials, interconnection, and manufacturing of heat pipes as disclosed herein are to be such as are known in the art.

In a further aspect of the present invention, a vapor absorption heat pump 50 is provided in which at least one component of the heat pump includes a plate comprising a heat pipe 10 as disclosed herein. This further aspect of the present invention is a significant application of the heat pipe 10 of the present invention, and holds considerable promise for energy conservation. Shown schematically in FIG. 1, vapor-absorption heat pumps 50 typically are comprised of a set of operatively interconnected components including an evaporator 54 indicated at E, an absorber 56 indicated at A, a vapor generator 60 indicated at G, and a condenser 62 indicated at C. Preferably, vapor-absorption heat pumps 50 further comprise a heat exchanger 58 indicated at HX, to exchange heat between fluids going to and from the vapor generator 60. The details of operation and construction of a vapor-absorption heat pump 50 are described by Cross et al in the '408 patent, which is incorporated herein by reference. While the operation of the vapor-absorption heat pump of the '408 patent describes the heating of a medium to be heated 64, it will be understood by one skilled in the art that such vapor-absorption heat pumps 50 may also be used to provide energy efficient cooling of a medium to be cooled in line 66. Such applications are discussed in numerous texts on thermodynamics, such as *Thermodynamics*, by J.P. Holman, 3d Ed., 1980.

Figure 1:
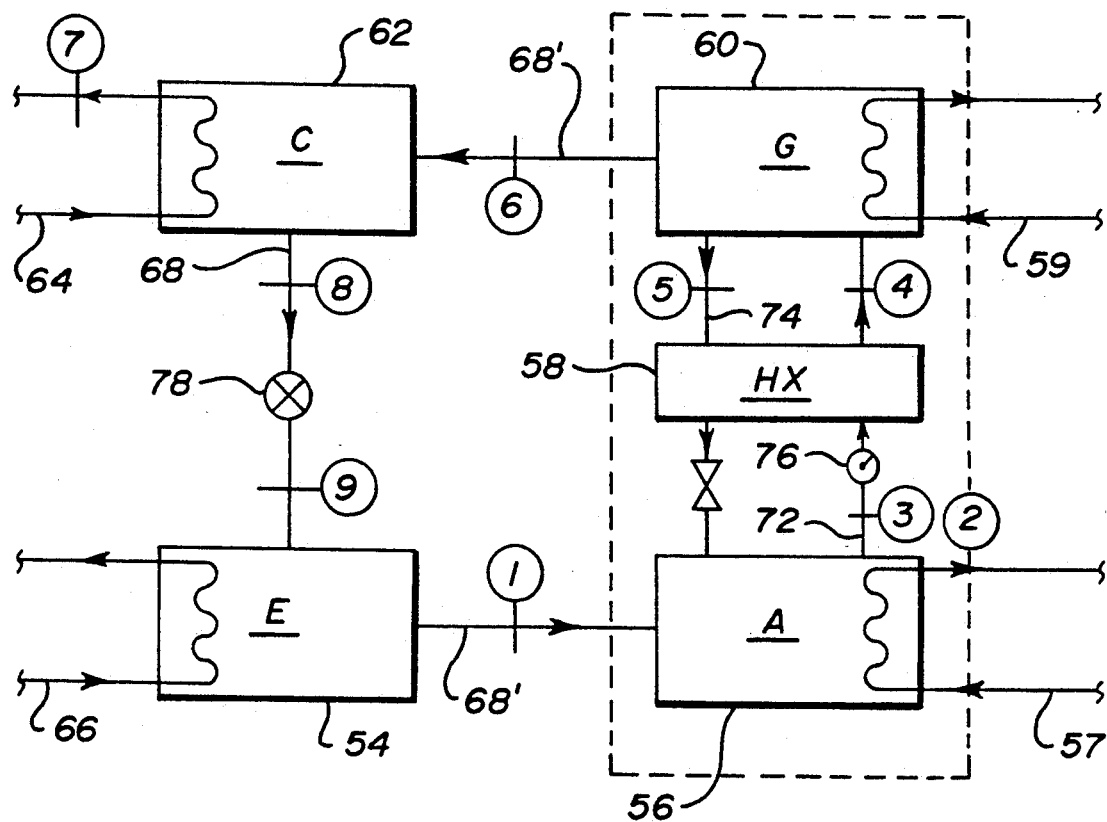
FIG. 1 is a schematic diagram of a conventional vapor absorption cycle.

With reference to FIG. 1, the operation of the vapor-absorption heat pump 50 will be briefly described. Such description will be helpful in understanding that aspect of the present invention wherein the heat pipe 10 comprises one or more plates in one or more components of a vapor-absorption heat pump. A working fluid 68 is circulated in the heat pump 10, and a solvent is circulated between the absorber and generator. By way of illustration, not limitation, ammonia, $NH_3$, and water are the most common combination of working fluid 68 and solvent used in heat pump systems.

In the vapor-absorption cycle, the absorber 56 and generator 60 replace the compressor familiar in vapor compression systems, as indicated by a dashed line in FIG. 1, while the evaporator 54 and condenser 62 function in the same manner as in compression systems. That is, heat is added at evaporator 54, evaporating working fluid 68 and thereby cooling a medium to be cooled in line 66, while heat rejection takes place at condenser 62 by condensing the working fluid vapor 68' and thereby warming a medium to be heated in line 64.

Following the cycle of working fluid 68 in the vapor-absorption cycle of FIG. 1, in the evaporator 54 heat is added to working fluid 68 until a saturated or slightly superheated working fluid vapor 68' is obtained at point 1. Entering the absorber 56, working fluid vapor 68' is absorbed by solvent, typically provided in a weak solution 74 of solvent and working fluid 68; and liberates the heat of absorption in the process, provided the temperature is held constant. Heat energy is removed at point 2 from absorber 56 in medium to be heated through line 57. The resulting strong solution 72 of solvent and working fluid 68 is taken off at point 3 and pumped to a higher pressure by pump 76 at point 4. The strong solution 72 is then placed in the generator 60 where heat is added from line 59 to boil off the working fluid 68 at the elevated pressure. Heat is typically added at the generator from a source of energy, such as steam heat, gas or electric heaters, available from a high quality energy source or as waste heat. The remaining weak solution 74 is then returned from the generator 60 to the absorber 56 to acquire a fresh charge of working fluid 68.

Working fluid vapor 68' present at point 6 from generator 60 enters condenser 62. Condensation at a high temperature in condenser 62 produces a saturated liquid working fluid 68 at point 8 which must then be expanded to low pressure in order to accommodate the low-temperature evaporation process in evaporator 54. Working fluid 68 is throttled from point 8 to point 9 with an expansion valve 78. Condensation in condenser 62 liberates the heat of condensation which is carried away in medium to be heated through line 64 at point 7. Again, heat is added at evaporator 54 from medium to be cooled in line 66, which typically conveys waste heat from a load or from an ambient source, and the cycle begins again.

In the overall absorption cycle the work input to the pump 76 is very small and the major source of energy which must be supplied from the outside is for the generator 60. Where the vapor-absorption cycle is used to heat a medium to be heated in lines 57 and 64, such as water for a heating system, heat is first input at point 2 from absorber 56, where the heat of absorption is released, and at point 7 from condenser 62 where the heat of condensation is released, thus heating the medium to be heated at two points. In such applications, the medium to be cooled in line 66 may constitute a low grade source of waste heat, such as warm water from a process. Conversely, where the vapor"absorption cycle is used for refrigeration of a medium to be cooled in line 66, such as water or air for a cooling system, heat is extracted in evaporator 54. It is to be noted that when used for refrigeration the absorption cycle requires substantially more heat-rejection facilities than vapor compression cycles because of the necessity to dissipate the heat of absorption from point 2 in addition to the heat of condensation at point 7. Other cycles, such as multi-stage, and various atmospheric and sub-atmospheric cycles include variations of the above, illustrative cycle.

Figure 7:
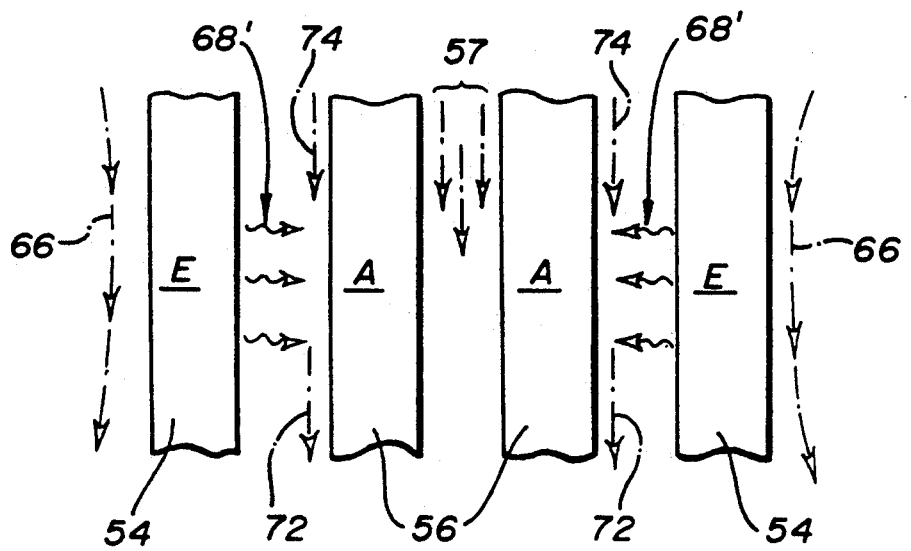
FIG. 7 is a schematic cross-sectional view of a combination evaporator/absorber for a vapor-compression heat pump wherein each includes a plate incorporating a heat pipe in accordance with the present invention.

Referring now to FIGS. 2–12, the heat pipe 10 of the present invention is shown in various embodiments. Any of the particular embodiments shown may be used in the components of a vapor-absorption heat pump, and no effort is made to restrict any particular component to the embodiment used to illustrate its function. The design variables previously mentioned with regard to the performance of heat pipe 10 in this particular application may, thus, be developed for this aspect of the present invention by one skilled in the art. Details concerning the materials, interconnection, and manufacturing of the vapor-absorption heat pump 50, as disclosed herein, are disclosed in the '408 patent or are such as are known in the art.

Where the heat pipe 10 of the present invention is adapted for use in any of the components of the illustrative vapor-absorption heat pump 50, a seal 80 is also provided between the periphery of heat pipe 10 and a container 82 to maintain separation between fluid streams, as in FIGS. 5–6 and 8–12. Preferably mounted for rotation around central axis 34 in a vertical plane, heat pipe 10, as shown in FIG. 5, may serve in the evaporator 54 as a plate across which heat of vaporization is transferred to evaporate heat pump working fluid 68. As shown in FIG. 6, heat pipe 10 may be used in absorber 56 to transfer heat liberated by absorption of working fluid vapor 68' in weak solution 74 to medium to be heated in line 57. Further shown in FIG. 7 is a combination evaporator/absorber including heat pipes 10. This modified component illustrates the application of the present invention to a other multi-element components of vapor-absorption heat pumps, such as those disclosed in the '408 patent.

Referring to FIG. 8, heat pipe 10 is shown transferring heat in heat exchanger 58, to preheat strong solution 72 with warm, returning weak solution 74 from generator 60. FIG. 9 shows that heat pipe 10 may be used to transfer heat in generator 60 between a source of heat, such as steam, in line 59 to strong solution 72 to generate high temperature higher pressure working fluid vapor 68'. Finally, FIG. 10 shows heat pipe 10 may be used in condenser 62 to transfer heat of condensation from condensing working fluid 68 to medium to be heated in line 64.

While certain representative embodiments and details have been shown for purposes of illustrating the present invention, it will be apparent to those skilled in the art that various changes in apparatuses disclosed herein may be made without departing from the scope of the invention, which is defined in the appended claims.

What is claimed is:

1. A rotatable plate for use in a vapor-absorption heat pump, wherein said plate provides high efficiency heat transfer across the first and second faces thereof, and wherein said plate is mountable for rotation, said plate further comprising:

a heat pipe having opposing first and second walls defining a sealed hollow body, said first and second walls having first and second faces, and opposing first and second inner surfaces, respectively;

said first face adapted for contact with a first fluid only and said second face adapted for contact with a second fluid only, for high efficiency heat transfer therebetween the outer periphery of said rotatable plate including a seal to substantially separate said first fluid in contact with said first face from said second fluid in contact with said second face;

a wick disposed along at least a portion of said first and second inner surfaces, said wick including at least one layer of wick material;

at least one portion of wick material disposed in said sealed hollow body, extending between said first and second inner surfaces, and spaced inward from the periphery of said sealed hollow body; and a quantity of heat pipe working fluid enclosed in said sealed hollow body.

2. A plate as recited in claim 1 wherein said sealed hollow body comprises a disk-shaped body.

3. A plate as recited in claim 2 wherein said disk-shaped body comprises a cylindrical shape.

4. A plate as recited in claim 1 wherein said first and second inner surfaces taper inward generally from the center to the periphery of said sealed hollow body.

5. A plate as recited in claim 1 wherein the separation between said opposing first and second inner surfaces decreases generally from the center to the periphery of said sealed hollow disk.

6. A plate as recited in claim 1 wherein said at least one portion of wick material extending between said first and second inner surfaces comprises at least one frustum.

7. A plate as recited in claim 6 wherein said at least one frustum comprises a conically shaped frustum.

8. A plate as recited in claim 1 wherein
said wick material a material chosen from the group consisting of screen mesh, fiberglass, sintered porous metal, carbon fibers, or combinations thereof.

9. A plate as recited in claim 1 wherein said heat pipe working fluid comprises a material chosen from the group consisting of nitrogen, oxygen, methane, water, ammonia, Freon 21, sodium, potassium, lithium and combinations thereof.

10. A plate as recited in claim 1 further comprising rotatable means for mounting said plate.

11. A plate as recited in claim 10 wherein said rotatable means for mounting is disposed transversely, generally along the center of said sealed hollow body.

12. A plate as recited in claim 1 further comprising means for rotatably mounting said plate in a vapor absorption heat pump.

13. A plate as recited in claim 1 wherein said first and second faces are configured to permit substantially free outward flow of said first and second fluids, respectively, from generally central portions thereof towards the periphery of said hollow body for high efficiency heat transfer therebetween.

14. A rotatable plate for use in a vapor-absorption heat pump wherein said plate provides high efficiency heat transfer across the first and second faces thereof, said plate comprising:
   a disk-shaped heat pipe having opposing first and second walls defining a sealed hollow body, said first and second walls having first and second faces, and opposing first and second inner surfaces, respectively, and
   a quantity of heat pipe working fluid enclosed in said sealed hollow body;
   wherein said first face is adapted to receive a first fluid only and said second face is adapted to receive a second fluid only, said first and second fluids received near the center portions of said first and second faces, respectively, the outer periphery of said rotatable plate including a seal to substantially separate said first fluid in contact with said first face from said second fluid in contact with said second face, and;
   wherein said first and second faces are configured to permit substantially free outward flow of said first and second fluids, respectively, towards the periphery of said hollow body for high efficiency heat transfer therebetween.

15. A plate as recited in claim 14 further comprising a wick disposed along at least a portion of said first and second inner surfaces, said wick including at least one layer of wick material and at least one portion of wick material disposed in said sealed hollow body, extending between said first and second inner surfaces, and spaced inward from the periphery of said sealed hollow body at a radial position intermediate between the center and periphery of said hollow body.

16. A plate as recited in claim 12 wherein:
   said first face has an inner region further comprising an insulating material inhibiting heat transfer between said inner region and that portion of said first inner surface opposite said inner region; and
   said second face has an outer region further comprising said insulating material inhibiting heat transfer between said outer region and that portion of said second inner surface opposite said outer region.

17. A plate as recited in claim 12 wherein said first and second inner surfaces taper inward generally from the center to the periphery of said sealed hollow body.

18. A plate as recited in claim 12 further comprising rotatable means for mounting said plate.

19. A method for using a rotatable plate for high efficiency heat transfer in a vapor absorption heat pump as one of a plurality of operatively connected components, wherein said plate comprises a heat pipe having opposing first and second walls defining a sealed hollow body, said first and second walls having first and second faces, and opposing first and second inner surfaces, respectively; and a quantity of heat pipe working fluid enclosed in said sealed hollow body; said method comprising the steps of:
   rotatably mounting said heat pipe in a vapor absorption heat pump;
   sealing said heat pipe along the outer periphery thereof to separate a first fluid in contact only with said first face from a second fluid in contact only with said second face;
   delivering first and second fluids at different temperatures generally near the center portions of said first and second faces, respectively; and
   rotating said heat pipe along an axis generally transverse to said first and second faces such that said first and second fluids flow outward across said first and second faces, respectively, for high efficiency heat transfer therebetween,

* * * * *